Figure 1:
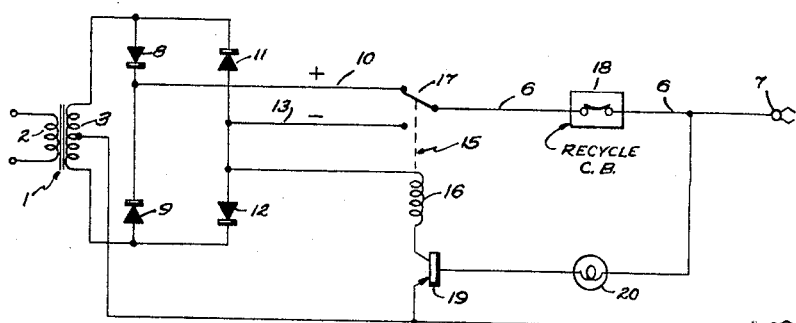

Sept. 13, 1966     J. B. GODSHALK ETAL     3,273,039
POLARITY CORRECTING CIRCUITS Filed April 24, 1963     2 Sheets-Sheet 1

INVENTOR.
JAMES B. GODSHALK
LEWIS A. MEDLAR
BY
Arnold & Raylance

INVENTOR.
JAMES B. GODSHALK
LEWIS A. MEDLAR
BY
Arnold and Roylance

United States Patent Office 3,273,039
Patented Sept. 13, 1966

3,273,039
POLARITY CORRECTING CIRCUITS
James B. Godshalk, West Pikeland Township, Chester County, and Lewis A. Medlar, Lansdale, Pa., assignors to Fox Products Company, Philadelphia, Pa., a corporation of Pennsylvania
Filed Apr. 24, 1963, Ser. No. 275,267
7 Claims. (Cl. 320—26)

This invention relates to battery chargers and more particularly to improved battery chargers incorporating novel circuits which automatically connect the charger to the battery with the proper polarity for charging regardless of how the battery is connected to the charger leads.

Persons operating battery chargers, and particularly those employed in service stations and garages to charge automobile storage batteries, generally have little technical skill. It is therefore highly desirable to construct the battery chargers to guard against improper operation. The most common difficulty encountered is when the battery is connected with reverse polarity, that is, with the polarity of the battery aiding, rather than opposing, the charger voltage. Reverse polarity connections result in extremely large current flow which can burn out the rectifier and transformer in the battery charger, so that the charger is totally ruined, or may damage the battery terminals beyond repair. If the battery has recently been in use, the arcing, which occurs at the battery terminals during connection of the charger in reverse, can cause explosions by igniting gases in the cells of the battery. If the cell caps are in place when the explosion occurs, the force of the explosion may shatter the battery casing and possibly injure the operator of the charger. Furthermore, if a service station charger is improperly connected to a battery in an automobile having an alternator system, a reverse connection can often burn out the rectifiers connected between the alternator and the automotive battery.

The past systems can be characterized as either polarity protection systems where the charger circuit is not completed unless the battery is connected with the proper polarity, or polarity correction systems where the interconnection between the charger and the battery is completed so that charging potential of the proper polarity is provided. Polarity protection systems are illustrated in applications Serial No. 63,343, filed October 18, 1960, by James B. Godshalk and Lewis A. Medlar, Serial No. 76,382, filed December 16, 1960, by James B. Godshalk, Lewis A. Medlar and George W. Purnell, and Serial No. 131,006, filed August 11, 1961, by James B. Godshalk. These polarity protection systems require relatively few components and have been employed with considerable success, particularly in large battery chargers where the components are relatively expensive due to the required high current handling capacity. If the initial connection is improper with a polarity protection system, it is necessary that the operator observe this and take the required corrective action. Hence, automatic polarity correcting systems, which eliminate this need, are more desirable. Furthermore, polarity protection systems which become defective either result in a completely inoperative battery charger, or in a battery charger providing absolutely no protection; problems which can be eliminated by properly designed polarity correction systems. Automatic polarity correction systems have been known in the past, but these systems have not proved particularly successful because of the complex circuitry involved and the relatively poor reliability achieved.

An object of this invention is to provide a battery charger including a relatively inexpensive, but yet highly reliable, polarity correction system.

Another object of this invention is to provide an automatic polarity correction system for a battery charger which utilizes one or more electromagnetic contactors to interrupt current flow in the charger leads, but which employs no other relays or moving parts.

Another object of this invention is to provide a polarity correction circuit which can effectively charge batteries even though portions of the circuit may be defective.

A better understanding as to the manner in which these and other objects are achieved in accordance with this invention may be obtained by referring to the following specification and drawings, these drawings forming a portion of the specification, and wherein:

FIGS. 1–5 schematically illustrate five separate embodiments of the invention.

One embodiment of the invention, as illustrated in FIG. 1, includes a power supply circuit with two sets of rectifiers operatively connected to provide charging potential which is either positive or negative with respect to a common conductor. The power supply circuit includes a transformer 1 having a primary winding 2 connectable to a suitable source of alternating current, and a center-tapped secondary winding 3. The center-tap of the secondary winding is connected to the common conductor which is also a heavy current carrying lead 4, lead 4 in turn being connected to a battery clamp 5. The two sets of rectifiers are connected across the ends of secondary winding 3 and are selectively connected at battery clamp 7 via a heavy current carrying lead 6. Battery clamps 5 and 7 are suitably dimensioned to grip the terminals of the batteries being charged. Semi-conductor diodes 8 and 9 form one set of rectifiers with their anodes connected, respectively, to opposite ends of secondary winding 3. The other set of rectifiers includes semi-conductor diodes 11 and 12 with their cathodes connected, respectively, to opposite ends of secondary winding 3. A conductor 10 is connected to the common cathode connection of diodes 8 and 9 and therefore provides a positive potential with respect to common conductor lead 4. A conductor 13 is connected to the common anode connection of diodes 11 and 12 and thus provide a negative potential with respect to the common conductor.

A solenoid contactor 15 has an actuating winding 16 and a set of movable contacts 17 which selectively connect either conductor 10 or conductor 13 to lead 6. In the normal deenergized state, movable contact 17 connects conductor 10 to lead 6, and therefore the polarity at the battery clamps is normally positive at clamp 7 with respect to clamp 5. Actuating winding 16 is connected between the common anode junction of diodes 11 and 12, and the collector of a PNP type transistor 19. The emitter of transistor 19 is connected to lead 4, and therefore winding 16 is energized by current flow through the emitter-collector circuit of transistor 19, only when the transistor is conductive.

The base of transistor 19 is connected to clamp 7 via a lamp bulb 20, and therefore transistor 19 becomes conductive whenever the potential is negative at clamp 7 with respect to clamp 5. Lamp bulb 20 acts as a positive temperature coefficient resistance to provide a very low impedance in the emitter base circuit of transistor 19 when relatively small potentials appear between clamps 5 and 7, and to provide increased current limiting resistance in the emitter base circuit as the potential between clamps 5 and 7 increases. The use of a positive temperature coefficient resistance in the base circuit of a polarity sensing transistor is more completely described in application Serial No. 131,006, filed August 11, 1961, by James B. Godshalk.

The contacts of a recycling circuit breaker 18 are connected in lead 6. This circuit breaker is connected to momentarily interrupt current flow in lead 6 when a predetermined overload current is sensed, as would occur when a battery is connected between clamps 5 and 7 with the improper polarity for charging. Interruption by the circuit breaker is momentary, and therefore, after a suitable short time delay, the contacts automatically close to again complete the current carrying path through lead 6.

In operation, the polarity of the battery as connected to clamps 5 and 7 is immaterial. The normal position of movable contact 17 is such that the charger output is normally positive at clamp 7 with respect to clamp 5. If a battery to be charged is connected with the positive terminal at clamp 7 and the negative terminal at clamp 5, the polarity is proper and therefore charging commences.

If the battery is connected with the opposite polarity, i.e., negative at clamp 7 with respect to clamp 5, an overload current would result which would be interrupted by circuit breaker 18. Prior to interruption by circuit breaker 18, the base of transistor 19 is connected to both the positive output of the charger and the negative terminal of the battery via lead 6, and therefore it is unlikely that transistor 19 could be rendered conductive since the charger output would most likely have the predominant effect on the potential appearing on lead 6. This effect is desirable since the heavy overload current can then be interrupted by the circuit breaker without a tendency of movable contact 17 to interrupt the current flow while changing polarity. As soon as the contacts of circuit breaker 18 open, the base of transistor 19 is connected only to the negative terminal of the battery at clamp 7, and therefore transistor 19 becomes conductive to in turn energize actuating winding 16 and connect negative conductor 13 to lead 6. Shortly thereafter, when circuit breaker 18 again completes the current carrying path in lead 6, the potential between leads 6 and 4 is of the proper polarity and therefore charging commences.

Figure 2:
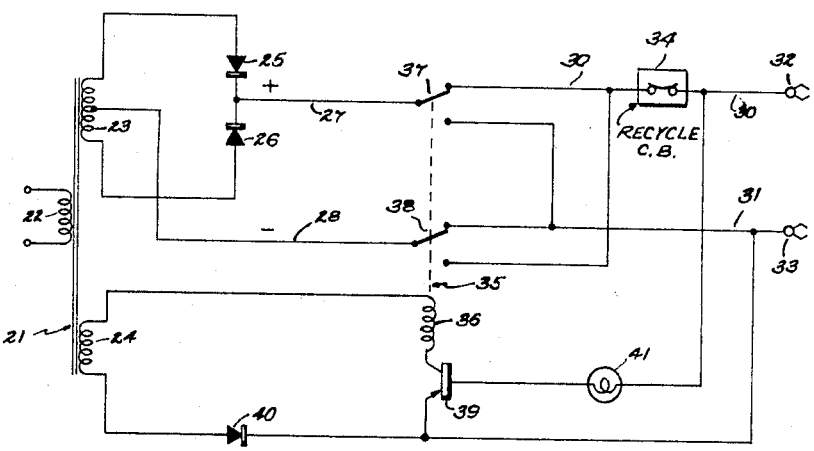

A second embodiment of the invention, which eliminates the need for two sets of diodes in the power supply circuit, is illustrated schematically in FIG. 2 and includes a transformer 21 having a primary winding 22 connectable to a suitable source of alternating current energy, a main center-tapped secondary winding 23 and an auxiliary secondary winding 24. The anodes of semi-conductor diodes 25 and 26 are connected, respectively, to opposite ends of main winding 23. A positive conductor 27 is connected to the common cathode connection of diodes 25 and 26, and a negative conductor 28 is connected to the center-tap of main winding 23. When the primary winding is energized, a source of charging potential is provided between conductors 27 and 28.

The pair of heavy current carrying leads 30 and 31 are connected, respectively, to battery clamps 32 and 33, the latter being suitably dimensioned to grip the terminals of the batteries being charged. A recycling circuit breaker 34, similar to circuit breaker 18 previously described with respect to FIG. 1, has contacts connected to momentarily interrupt current flow in lead 30.

A solenoid contactor 35 has an actuating winding 36 and two sets of movable contacts 37 and 38. The stationary contacts of contactor 35 are connected so that, when the contactor is in the deenergized state, i.e., when actuating winding 36 is not energized, positive conductor 27 is connected to lead 30 and negative conductor 28 is connected to lead 31. When the contactor is in the energized state, positive conductor 27 is connected to lead 31 and negative conductor 28 is connected to lead 30 via the movable contacts. Accordingly, the polarity of charging potential available between clamps 32 and 33 can be changed by energizing the actuating winding of solenoid contactor 35.

Actuating winding 36 is connected between one end of auxiliary winding 24 and the collector of a PNP type transistor 39. A semi-conductor diode 40 is connected between the other end of the auxiliary winding and the emitter of transistor 39, and is poled in a direction to permit current flow through the emitter-collector circuit of transistor 39 and actuating winding 36 when the transistor is conductive. The emitter of transistor 39 is connected to lead 31, and the base of the transistor is connected to lead 30 via a lamp bulb 41 acting as a positive temperature coefficient resistance. Transistor 39 functions similar to transistor 19 and is rendered conductive to energize actuating winding 36 only when the potential on lead 30 is negative with respect to that appearing at lead 31.

If clamps 32 and 33 are connected, respectively, to the positive and negative terminals of a battery, charging commences since the connection via movable contacts 37 and 38 in their normal position provides a charging potential of the proper polarity. However, if clamp 32 is connected to the negative terminal of the battery, and clamp 33 to the positive terminal, the initial connection is improper, resulting in an overload current causing the contacts of circuit breaker 34 to momentarily open. While the circuit breaker contacts are open, the base of transistor 39 is disconnected from positive conductor 27, and therefore the negative battery potential appearing at clamp 32 renders the transistor conductive to in turn energize actuating winding 36. When the contacts of circuit breaker 34 subsequently close, the charging potential provided between clamps 32 and 33 is of the proper polarity and therefore charging commences.

Figure 3:
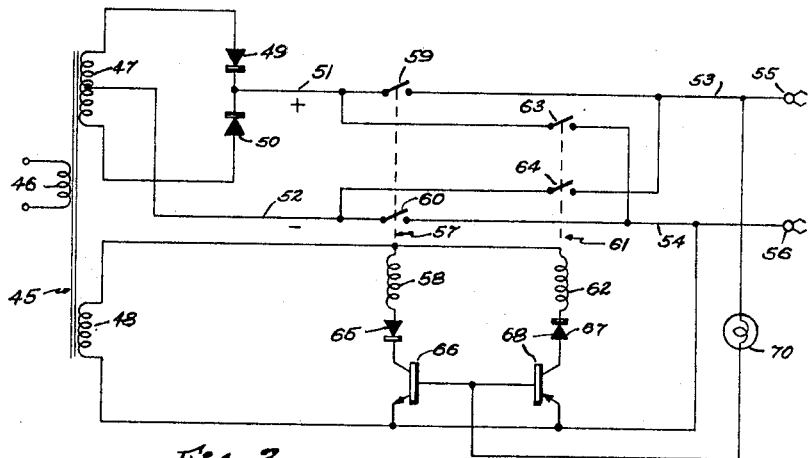

Another embodiment of the invention is shown in FIG. 3 wherein the recycling circuit breaker is eliminated. The power supply circuit includes a transformer 45 having a primary winding 46 connectable to a suitable source of alternating current, a center-tapped secondary main winding 47, and an auxiliary secondary winding 48. The anodes of a pair of semi-conductor diodes 49 and 50 are connected, respectively, to opposite ends of main winding 47. A positive conductor 51 is connected to the common cathode junction of diodes 49 and 50, and a negative conductor 52 is connected to the center-tap of the main winding 47. A pair of output leads 53 and 54 are connected, respectively, to a pair of battery clamps 55 and 56, these battery clamps being suitably dimensioned to grip the terminals of batteries being charged.

The normally open contacts 59 and 60 of a solenoid contactor 57 are operative to connect conductors 51 and 52, respectively, to leads 53 and 54. The normally open contacts 63 and 64 of a solenoid contactor 61 are operative to connect conductors 51 and 52, respectively, to leads 54 and 53. Thus, a charging potential of one polarity is available at clamps 55 and 56 when an actuating winding 58 of solenoid contactor 57 is energized, and charging potential of the opposite polarity is available when actuating winding 62 of solenoid contactor 61 is energized.

Actuating winding 58 is connected in series with a semi-conductor diode 65 and the collector-emitter circuit of an NPN type transistor 66, this series combination being connected across auxiliary winding 48. Diode 65 rectifies the alternating current potential appearing across the auxiliary winding, and is poled in a direction so that current flows through the collector-emitter circuit of the transistor and the auxiliary winding when the transistor 66 is conductive. Actuating winding 62 is connected in series with a semi-conductoor diode 67 and the collector-emitter circuit of a PNP type transistor 68. Diode 67 rectifies the alternating current potential appearing across the auxiliary winding and is poled in a direction to permit current flow through the emitter-collector circuit of the transistor and the actuating winding when transistor 68 is conductive.

The bases of transistors 66 and 68 are connected to lead 55 via a lamp bulb 70, and the emitters of these transistors are connected to lead 54. Lamp bulb 70 acts as a positive temperature coefficient resistance to limit current as the potential appearing between lamps 55 and 56 increases. It should be noted that transistors 66 and 68 are of opposite conductivity types, and therefore, if the potential is positive at clamp 55 with respect to clamp 54, only transistor 66 becomes conductive, whereas if the polarity at clamps 55 and 54 is reversed, only transistor 68 becomes conductive.

In the normal state, the contacts of contactors 57 and 61 are all in the open position, and therefore leads 54 and 53 are disconnected from the source of charging potential available on conductors 51 and 52. When a battery is connected, either transistor 66 or 68 becomes conductive to properly connect conductors 51 and 52 to leads 53 and 54, so as to provide charging potential of the proper polarity for charging. For example, if the battery is connected with the positive and negative terminals connetced to clamps 55 and 56, respectively, transistor 66 becomes conductive, energizing actuating winding 58. Movable contact 59 connects positive conductor 51 to the positive terminal of the battery via clamp 55, and movable contact 60 connects negative conductor 52 to the negative conductor of the battery via clamp 56. If, instead, the negative terminal of the battery is connected to clamp 55 and the positive terminal to clamp 56, transistor 68 becomes conductive, energizing actuating winding 62. Under these circumstances, movable contact 63 connects positive conductor 51 to clamp 56 which is connected to the positive terminal of the battery, and movable contact 64 connects negative conductor 52 to clamp 55 which is connected to the negative terminal of the battery. Accordingly, the proper polarity is always provided to the battery clamps regardless of how the battery is connected to the clamps.

In larger battery chargers it is desirable to utilize standard solenoid contactors having a single set of contacts since these units are produced in large quantities for automobile use and are fairly inexpensive compared to multiple contact solenoid units of the type required in FIGS. 1–3. An automatic polarity correcting battery charger utilizing single contact solenoid units is illustrated schematically in FIG. 4.

The power supply portion of this battery charger includes a transformer 71 having a primary winding 72 connectable to a suitable source of alternating current energy, and a center-tapped secondary winding 73. Two sets of rectifiers are connected across the secondary winding to provide, respectively, a positive and a negative source of charging potential with respect to the center-tap of secondary winding 73. More specifically, the anodes of a pair of semi-conductor diodes 74 and 75 are connected, respectively, to opposite ends of secondary winding 73 forming one set of rectifiers which provide a positive potential at their common cathode junction 76. The cathodes of semi-conductor diodes 77 and 78 are connected, respectively, to the opposite ends of secondary winding 73 forming the other set of rectifiers which produce a negative potential at their common anode junction 79.

A pair of output leads 80 and 81 are connected, respectively, to a pair of battery clamps 82 and 83, the latter being suitably dimensioned to grip the terminals of a battery being charged. Lead 80 is connected to the center-tap of secondary winding 73. Lead 81 can selectively be connected to positive junction 76 via normally open contacts 84 of a solenoid contactor 85, or can be connected to negative junction 79 via normally open contacts 87 of a solenoid contactor 88.

Actuating winding 86 of solenoid contactor 85 is connected between positive junction 76 and the collector of an NPN type transistor 90. Actuating winding 89 of solenoid contactor 88 is connected between negative junction 79 and the collector of a PNP type transistor 91. The emitters of these transistors are connected to lead 80 and the bases are connected to lead 81 via a lamp bulb 92 which provides current limiting protection.

If a battery is connected with the positive and negative terminals connected to clamps 83 and 82, respectively, the bases of transistors 90 and 91 are positive with respect to their emitters. Under these circumstances, only transistor 90 becomes conductive thus permitting current flow from positive junction 76 through actuating winding 86 and the collector-emitter circuit of transistor 90. When actuating winding 86 is energized, contacts 84 close connecting positive junction 76 to lead 83 thus providing charging potential of the proper polarity, i.e., positive at clamp 83 with respect to clamp 82. If the battery is instead connected with the positive terminal at clamp 82 and negative terminal at clamp 83, the bases of transistors 90 and 91 are negative with respect to their emitters. Under these circumstances, only transistor 91 becomes conductive permitting current flow from the center-tap of secondary winding 73 through lead 80, the emitter-collector circuit of the transistor, actuating winding 89, and diodes 77 and 78. When actuating winding 89 is energized, contacts 87 close and therefore negative junction 79 is connected to lead 81 to provide the proper polarity for charging the battery.

Figure 5:
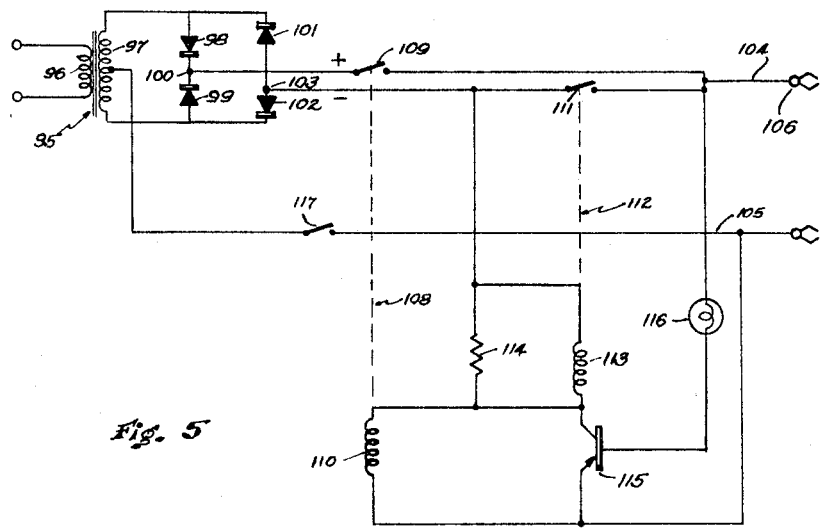
Figure 4:
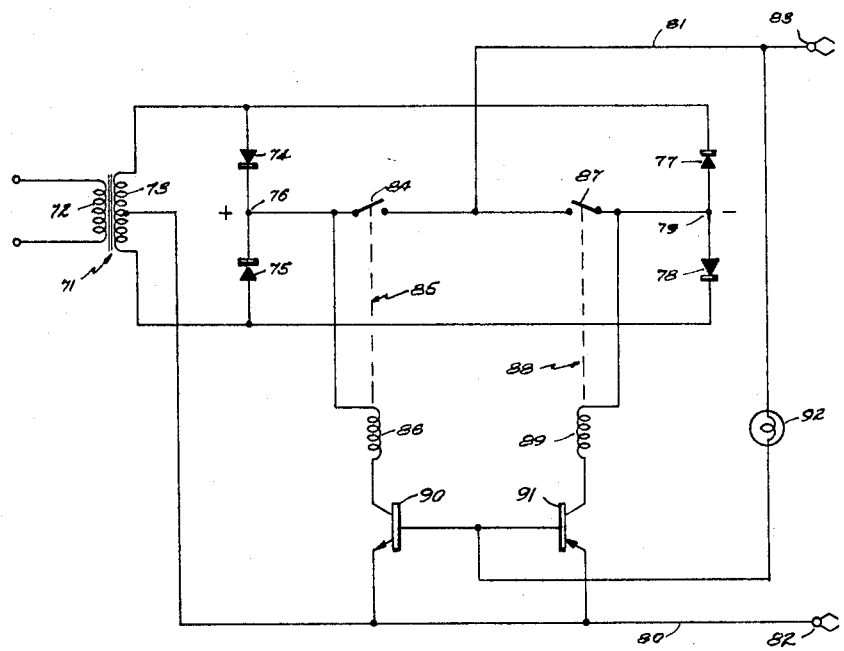

Another embodiment of the invention wherein automatic polarity correction is achieved with single contact type solenoid contactors, but with only a single transistor, is illustrated in FIG. 5. The power supply portion of the system includes a transformer 95 having a primary winding 96 connectable to a suitable source of alternating current energy, and a center-tapped secondary winding 97. A pair of semi-conductor diodes 98 and 99 have their anodes connected, respectively, to opposite ends of secondary winding 97 to provide a positive source of charging potential at their common cathode junction 100. The cathodes of another pair of semi-conductor diodes 101 and 102 are connected, respectively, to opposite ends of secondary winding 97 to provide a negative source of charging potential at their common anode junction 103.

The output leads 104 and 105 are connected, respectively, to battery clamps 106 and 107 suitably dimensioned to grip the terminals of the battery being charged. Lead 105 is connected to the center-tap of secondary winding 97. Lead 104 is connected to positive junction 100 when contacts 109 of a solenoid contactor 108 are closed, and is connected to negative junction 103 when contacts 111 of a solenoid contactor 112 are closed.

The actuating windings 110 and 113, of solenoid contactors 108 and 112, respectively, are connected in a series with one another between negative junction 103 and the center-tap of secondary winding 97. Windings 110 and 113 are so arranged that, disregarding transistor 115 for the moment, only winding 110 is sufficiently energized to close the associated contacts when the series circuit is energized. This can be accomplished by carefully selecting the number of turns in windings 110 and 113 and by providing winding 110 with the larger number of turns so that the series current flow is only sufficient to energize winding 110, but not winding 113. This can also be accomplished, as shown in FIG. 5, by utilizing similar actuating windings, and by placing a resistor 114 in parallel with winding 113 to decrease the voltage and current in winding 113. The value of resistor 114 is so selected that only winding 110 receives sufficient voltage and current to close the associated contacts.

The collector-emitter circuit of a PNP type transistor 115 is connected across solenoid winding 110. The base of the transistor is connected to lead 104 via a lamp bulb 116 which provides current limiting protection. If the potential on lead 104 is negative with respect to lead 105, the base of transistor 115 is negative with respect to the emitter and therefore the transistor becomes conductive. When transistor 115 is conductive it shunts actuating winding 110 thus deenergizing this actuating winding, and also increases the current flow through actuating winding 113 to thereby close contacts 111. A suitable switch 117 is disposed in lead 105.

Switch 117 is left in the open position when clamps 106 and 107 are attached to the battery to be charged.

If the battery is connected with the positive terminal connected to clamp 106 and the negative terminal connected to clamp 107, transistor 115 cannot become conductive and therefore when switch 117 is closed only actuating winding 110 is energized. Under these circumstances, contacts 109 are closed and positive junction 100 is connected to clamp 106 to provide charging potential in the proper polarity. If, on the other hand, the negative terminal of the battery is connected to clamp 106 and the positive terminal is connected to clamp 107, the base of transistor 115 is negative with respect to the emitter and therefore transistor 115 will become conductive when switch 117 is closed. Accordingly, only winding 113 is energized and therefore lead 104 is connected to negative junction 103 thereby providing charging potential with the proper polarity.

The circuit illustrated in FIG. 5 may not provide proper polarity correcting action if switch 117 is closed prior to connecting clamps to the battery. Therefore, it may be desirable to utilize a recycling circuit breaker instead of switch 117. The recycling circuit breaker would be connected in lead 104 and in a fashion similar to that previously illustrated with regard to FIGS. 1 and 2.

It should be noted with regard to the units shown in FIGS. 1 and 2 that, if the battery is connected with the proper polarity, charging can commence with the solenoid contacts in their normal position even though the polarity correction circuit may be defective. If the battery is connected with the opposite polarity, the circuit breaker interrupts the circuit and therefore no serious damage can result. The same applies to the unit illustrated in FIG. 5 when a circuit breaker is utilized. In the units shown in FIGS. 3 and 4, the polarity correction portion includes two independently operating circuits. If one of these circuits becomes defective, it is not possible to charge the battery with one polarity connection, but the other circuit is operative to permit charging if the polarity of the battery connection is reversed.

It should be noted that an electrical relay device is defined as any electrical device which controls one electrical function in accordance with a different electrical function. Thus, the term electrical relay device encompasses, within its definition, a large variety of devices other than electromagnetic relays, such as, for example, hot-wire relays, thyratrons, silicon controlled rectifiers and transistors.

While a few illustrative embodiments have been described in detail to illustrate the concepts of the invention, it should be obvious that there are numerous variations which could be employed without departing from the scope of the invention. For example, the transistor shown can be replaced by other types of polarity sensitive electrical devices, and the electromagnetic relays shown can be replaced by other types of electrical relay devices. The scope of the invention is more particularly defined in the appended claims.

What is claimed is:
1. In a circuit for connecting a battery to a battery charger with the proper polarity, the combination of
   a pair of leads connectable to the terminals of a battery to be charged;
   a source of charging current for normally applying charging potential of one polarity to said leads, said source having two output conductors and a common conductor, said two output conductors providing charging potential of opposite polarity with respect to a common conductor, one of said leads being connected to said common conductor and the other of said leads being selectively connected to one of the remaining conductors;
   polarity responsive circuit means connected between said leads and operative to reverse the polarity of potential applied by said source to said leads, said polarity responsive circuit means including
      a relay having an actuating winding and contacts so arranged that said source is connected to said leads to provide potential of one polarity when said actuating winding is not energized, and of the opposite polarity when said actuating winding is energized, and
      a transistor having three electrodes, one said electrode being connected to said actuating winding of said relay and being operative to energize said actuating winding when energized, said other electrodes being connected between said leads so as to become conductive whenever a battery is connected to said leads with said opposite polarity.

2. In a circuit for connecting a battery to a battery charger with the proper polarity for charging, the combination of
   a source of battery charging current having a positive, a negative, and a common conductor;
   a pair of leads connectable to the terminals of the battery to be charged, one of said leads being connected to said common output conductor;
   circuit completing means for connecting said source to said leads with the proper polarity,
   said circuit completing means comprising
      a first electrical relay device having an actuating winding and a first contact set, said contact set being operative when closed to connect the other of said leads to said positive output conductor,
      a second electrical relay device having an actuating winding and a second contact set, said second contact set being operative when closed to connect the other of said leads to said negative output conductor,
      said contact sets each being closed when the respective associated windings are energized,
      a first transistor having three electrodes, two of said electrodes being connected in series circuit relationship with said actuating winding of said first relay device between said common conductor and one of said positive and negative conductors, and
      a second transistor having three electrodes, two of said electrodes being connected in series circuit relationship with said actuating winding of said second relay device between said common conductor and one of said positive and negative conductors,
      the remaining electrodes of said transistors being connected to said other lead,
      said first transistor being responsive to a predetermined polarity of the battery as connected to said leads to become conductive and to energize said first relay device, and
      said second transistor being responsive to a polarity opposite to said predetermined polarity to become conductive and to energize said second relay device.

3. In a circuit for connecting a battery to a battery charger with the proper polarity, the combination of
   a source of battery charging current having a positive, a negative, and a common output conductor;
   a pair of leads connectable to the terminals of the battery being charged, one of said leads being connected to said common output conductor;
   circuit completing means for connecting said source to said leads with the proper polarity for charging the battery,
   said circuit completing means comprising
      a first electrical relay device having an energized condition and a de-energized condition and being operative, when energized, to connect the other of said leads to said positive output conductor, and
      a second electrical relay device having an energized condition and a de-energized condition and being operative, when energized, to connect the other of said leads to said negative output conductor,
one of said first and second relay devices normally being energized, and
a transistor having three electrodes, two of said electrodes being connected between said leads in a manner to render said transistor conductive when a battery is connected to said leads with a polarity improper for charging,
said transistor being connected to said relay devices and being operative, when conductive, to de-energize the normally energized relay device and to energize the normally de-energized relay device.

4. In a circuit for connecting a battery to a battery charger with the proper polarity, the combination of
a pair of leads connectable to the terminals of a battery being charged;
a source of charging current for normally applying charging potential of one polarity to said leads, said source having two output conductors and a common conductor, said two output conductors providing charging potential of opposite polarity with respect to said common conductor, one of said leads being connected to said common conductor and the other of said leads being selectively connected to one of the remaining output conductors;
a recycling circuit breaker connected to momentarily interrupt current flow in at least one of said leads when a battery is connected thereto with a polarity improper for charging; and
polarity responsive circuit means connected between said leads and operative to reverse the polarity of potential applied by said source to said leads during said momentary interruption by said circuit breaker, said polarity responsive circuit means including
a relay having
an actuating winding and
contacts so arranged that said source is connected to said leads to provide potential of one polarity when said actuating winding is not energized, and of the opposite polarity when said actuating winding is energized; and
a transistor having three electrodes, one of said electrodes being connected to said actuating winding of said relay and being operative to energize said actuating winding when energized, said other electrodes being connected between said leads so as to render said transistor conductive whenever a battery is connected to said leads with said opposite polarity.

5. In a circuit for connecting a battery to a battery charger with the proper polarity for charging, the combination of
a source of charging potential;
a pair of leads connectable to the terminals of the battery being charged;
a first and second relay each having an actuating winding and a set of contacts,
said sets of contacts being connected between said source and said leads so that charging potential of either polarity can selectively be provided between said leads depending upon which of said actuating windings is energized;
circuit means interconnecting said source and said actuating windings of said first and second relays so that only the actuating winding of said first relay is normally actuated; and
transistor means having electrodes connected to said leads to sense the polarity of the battery as connected to said leads and operative to energize the second actuating winding and de-energize the first actuating winding when the battery polarity is improper for charging with said first actuating winding energized.

6. In a circuit for connecting a battery to a battery charger with the proper polarity for charging, the combination of
a source of battery charging current having a positive, a negative and a common output conductor;
a pair of leads connectable to the terminals of the battery being charged, one of said leads being connected to said common output conductor;
first circuit means comprising
a first transistor having a control electrode and two other electrodes, said control electrode and one of said other electrodes being connected between said leads so that said transistor is rendered conductive when the battery, as connected to said leads, has a predetermined polarity,
a first relay having an energizing winding and circuit completing means, said energizing winding being connected to the remaining electrode of said first transistor,
said first relay being operative to actuate said circuit completing means to connect one of said positive and negative output conductors to the other one of said leads when said first transistor is conductive to provide a charging potential between said leads having said predetermined polarity; and
second circuit means comprising
a second transistor having a control electrode and two other electrodes, said control electrode and one of said other electrodes being connected between said leads to render said transistor conductive when the battery, as connected to said leads, has a polarity opposite said predetermined polarity, and
a second relay having an energizing winding and circuit completing means, said energizing winding being connected to the remaining one of said electrodes of said second transistor,
said second relay being operative when said second transistor is conductive to actuate said circuit completing means to connect the other of said positive and negative output conductors to the other one of said leads to provide a charging potential between said leads having said opposite polarity.

7. Apparatus in accordance with claim 6 wherein
said circuit completing means of said first relay includes a single set of contacts for connecting said positive conductor to the other said leads, and
said circuit completing means of said second relay includes a single set of contacts for connecting said negative conductor to said other lead.

References Cited by the Examiner
UNITED STATES PATENTS

| | | | |
|---|---|---|---|
| 2,820,181 | 1/1958 | Bowman et al. | 317—8 X |
| 3,085,187 | 4/1963 | Godshalk | 320—25 |
| 3,118,101 | 1/1964 | Arber | 320—26 |
| 3,177,379 | 4/1965 | McCullough | 307—127 |
| 3,183,331 | 5/1965 | Barkan | 200—89.4 X |

JOHN F. COUCH, *Primary Examiner.*

LLOYD McCOLLUM, *Examiner.*

S. WEINBERG, *Assistant Examiner.*